Patented May 10, 1949

2,469,827

UNITED STATES PATENT OFFICE 2,469,827

COAGULATION OF EMULSION POLYMERS

Joseph P. Johnson, Akron, Ohio, assignor to Wingfoot Corporation, Akron, Ohio, a corporation of Delaware No Drawing. Application August 23, 1945, Serial No. 612,297

9 Claims. (Cl. 260—84.5)

This invention relates to a novel method of coagulating aqueous emulsions of polymeric materials. More specifically, the invention relates to a method of precipitating polymers from emulsions in particles of uniform size which can thereafter be conveniently processed to form desirable compositions.

In the preparation of plastics by procedures involving the formation of aqueous emulsions, the problem of obtaining uniform high quality products is encountered. Compositions varying in physical properties are undesirable since it is difficult to predict the amount of mechanical processing, the type of machinery, and the capacity of said machinery necessary to work the precipitated polymers to a desirable form. Accordingly, one purpose of this invention is to provide a method of coagulating polymers to form a uniform, desirable particle size which can be washed efficiently to form a low ash composition which can easily be further processed by milling or other mixing operations to form a desirable resin having uniform reproducible physical properties. A further purpose of this invention is to provide a method of controlling the precipitation of emulsion polymerizates to form products having a predetermined particle size.

The procedures for preparing emulsion polymers are well known to the art. Generally, the monomeric compositions capable of polymerization are subjected to conditions of polymerization while suspended in an aqueous emulsion. In order to maintain the reactants in an emulsified state a continuous and vigorous mixing action is provided by rocking or rotating the polymerization vessel or by providing a suitable stirring device. Usually, an emulsifying agent or wetting agent is desirable to insure a finely subdivided mixture of reagents in aqueous suspension.

The emulsifying agents are usually chemical compounds having both hydrophilic and hydrophobic radicals or substituents. A wide variety of wetting agents are known to the art and used in promoting the formation of emulsion polymers. Typical emulsifying agents are the alkali metal oleates or the alkali metal salts of other high molecular weight fatty acids or mixtures thereof such as are present in ordinary "soaps," the alkyl sulfates, the alkyl aryl sodium sulfonates, the alkyl aryl sulfates, the alkali metal sulfonates of N-ethyl substituted higher fatty acid amides, the sodium salts of the sulfate mono ester of the higher fatty alcohols including lauryl, the alkyl aryl sodium succinates, the alkyl aryl sodium naphthenates, various sulfonated hydrocarbons, the sodium sulfonates of the alkyl substituted diphenyls, the sodium alkyl naphthalene sulfonates and sulfonated aromatic ether alcohols. Although the alkali metal salts are generally preferred, the acids themselves have emulsifying properties.

It will be noticed that many of the emulsifying agents are the sulfates and sulfonates having the general structural formula

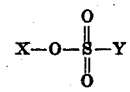

wherein X is a hydrophilic radical, such as H, Na, and K, and Y is a hydrophobic radical, preferably a hydrocarbon radical or an oxyhydrocarbon radical containing ten or more carbon atoms, or an ether, ester or amide radical containing a hydrocarbon group of ten or more carbon atoms. Any one or more of the enumerated compounds or classes of compounds and preferably the sulfates and sulfonates having the defined structure

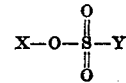

may be introduced into the polymerization vessel for the purpose of stabilizing the emulsion during the period of polymerization.

The other conditions of polymerization will depend upon the nature of the monomer being polymerized. Generally a slightly elevated temperature from 30 to 60° C., or possibly as high as 100° C. in the case of less active monomers, may be required. Frequently it is desirable to introduce oxidants such as benzoyl peroxide, hydrogen peroxide or sodium perborate. Occasionally other catalysts may be required, for example boron trifluoride, acetaldehyde, carbon tetrachloride or stannic chloride. Some polymerizations require a control of the hydrogen ion concentration within the reaction vessel and this may be accomplished by adding to the aqueous emulsion a predetermined proportion of a buffer solution, for example a mixture of citric acid and disodium phosphate. The methods of preparing the polymerized emulsions are not regarded as novel, and are not a part of this invention.

Compositions which may be prepared by emulsion polymerization procedures are in general the olefinic compounds, which contain unsaturated bonds capable of chemical reaction to form macromolecular structures. Most synthetic rubbers are of this type. Suitable synthetic rubbers which may be coagulated by this novel method are polychloroprene, polyisoprene, polybutadiene, copolymers of butadiene and mono-olefinic monomers, such as styrene, acrylonitrile, methyl methacrylate, other alkyl acrylates and alpha-substituted alkyl acrylates, the alkyl fumarates, maleates, chloromaleates, and chlorofumarates.

It is customary to coagulate the emulsions prepared by the above described polymerization techniques. This coagulation or precipitation is accomplished by adding agents which destroy the emulsifying agent or which otherwise cause the separation of the aqueous solution from the solid resin suspended therein. Suitable coagulation agents are the alcohols and metallic salts, such as sodium chloride, zinc chloride, aluminum sulfate, barium chloride and sodium sulfate. Generally, any solute will induce the precipitation of the solid polymer, although many compounds are undesirable because of the effect which traces of said compounds may have upon the polymer. The preferred coagulants are those which have no effect on the properties of the polymer or which induce a beneficial effect therein or which are readily removed from the polymer in a subsequent purifying step.

The procedure of this invention contemplates the use of any of these metal salt coagulants, but is particularly directed to the use of any water soluble salt of iron, calcium, magnesium, strontium, barium, lead, and particularly of zinc and aluminum. For reasons of economy the use of the chlorides or sulfates is preferred. In accordance with this invention, from 20 to 50 percent of that amount of an alkali metal hydroxide or ammonium hydroxide which is the molecular equivalent of the soluble salt used, is added with the salt to the stabilized emulsion. It has been found that the addition of less than 20 percent of the molecular equivalent of the alkali metal or ammonium hydroxide will induce the formation of large particles of the polymer which are generally difficult to wash since they occlude metal salt. The use of more than 50 percent of the alkali metal hydroxide, or ammonium hydroxide will induce the precipitation of very fine particles which, although they may be easily washed, are difficult to process by the conventional methods. By a careful control of the amount of alkali metal hydroxide or ammonium hydroxide which is added, it is possible to prepare uniform particles of any desired size. It has been found that the particle sizes produced by the use of from 20 to 50 percent of the alkali metal or the ammonium hydroxide are both readily washable and can easily be processed by conventional rubber or resin mixing machinery.

The invention is practiced by mixing the metal salt precipitant with the desired proportion, within the range of from 20 to 50 percent, of an alkali metal hydroxide, such as sodium hydroxide, potassium hydroxide, or ammonium hydroxide. Generally, solutions containing from 0.3 to 0.5 percent of the metal salt are used for the precipitation of emulsions. After mixing the emulsion with the alkaline salt solution the mass is screened to eliminate the bulk of the aqueous solution and the precipitated polymer is dewatered by pressing with rollers or other standard pressing machinery. The polymers may then be cut into small fragments and subsequently dried in any suitable oven. The dried polymers are compounded by methods well known in the art.

The molecular phenomenon involved in this invention is not entirely understood but it is believed that the alkali metal hydroxide or ammonium hydroxide, forms a film around the agglomerated rubber, or other plastic, particles and thereby prevents undue particle growth. Under the usual precipitating conditions the growth is not limited and the large particles resulting are frequently very difficult to dewater, shred and dry. The use of this invention enables an increased production without changing the equipment used in conventional polymerization processes.

Further details of the practice of this invention are set forth with respect to the following examples:

*Example 1*

Using a commercial synthetic rubber latex of a copolymer of butadiene-1,3 and acrylonitrile, precipitations were conducted using a solution of zinc chloride and ammonium hydroxide. The coagulant in each case was comprised of 1000 grams of water and 5 grams of zinc chloride. The aqueous ammonium hydroxide (28 percent $NH_3$) in the coagulant was varied in each of the three experimental precipitations. 200 cc. of rubber latex containing ½ percent sodium alkyl aryl sulfonate and 2 percent of a polymerized organic salt of the alkyl aryl sulfonic acid type, each percentage based on the charged monomers, as a stabilizing agent was used in each coagulation.

| Zinc Chloride | Ammonium Hydroxide | Particle Size | Molecular Equivalent |
|---|---|---|---|
| Grams | Grams | | Per cent |
| 5 | 2.30 | Small | 51.5 |
| 5 | 1.15 | Medium (Uniform) | 25.8 |
| 5 | 1.00 | do | 22.4 |

*Example 2*

Experimental precipitations were made using a solution of aluminum sulfate and aqueous ammonium hydroxide (28 percent $NH_3$) and a procedure identical to that described above in Experiment 1. The following tabulation shows the relationship of the particle size to the concentration of ammonium hydroxide used.

| Aluminum Sulfate | Ammonium Hydroxide | Molecular Equivalent | Particle Size |
|---|---|---|---|
| Grams | Grams | Per cent | |
| 5 | 1.0 | 18.8 | Large—hard to control. |
| 5 | 1.5 | 28.2 | Medium (Uniform). |
| 5 | 2.0 | 37.6 | Medium (Small). |

*Example 3*

Experimental precipitations were made in the manner described in Example 1 except that the aluminum sulfate and sodium hydroxide (50 percent solution) were used in varying proportions as follows:

| Aluminum Sulfate | Sodium Hydroxide | Molecular Equivalent | Particle Size |
|---|---|---|---|
| Grams | Grams | Per cent | |
| 5 | 1.0 | 14 | Large stringy. |
| 5 | 1.5 | 21 | Medium large. |
| 5 | 2.0 | 28.5 | Medium (Uniform). |

*Example 4*

A production lot of latex of a copolymer of butadiene-1,3 and acrylonitrile was coagulated with a solution of 200 pounds of alum $$(Al_2(SO_4)_3 \cdot 10H_2O)$$

and 40 pounds of 50 percent sodium hydroxide solution dissolved in 200 gallons water. This 12 percent alum solution was added at the rate of 0.8 gallon per minute to a large tank to which fresh water was added at the rate of about 36 gallons per minute. The resulting solution was pumped into a coagulating vessel having a volume of 115 gallons. The coagulating vessel was agitated with two 14 inch diameter down-thrust propellers driven at the rate of 475 R. P. M. The latex was pumped from the storage tank into the coagulator at a rate sufficient to coagulate 500 pounds of dry rubber per hour. The coagulated rubber slurry was passed from the coagulating vessel over a screen for the purpose of separating the bulk of the water, through a series of rollers to separate more water and agglomerate the mass and then passed to a grinder and drying oven. The sodium hydroxide used in this precipitation amounted to 23 percent of the molecular equivalent quantity of sodium hydroxide with respect to the alum. The coagulated rubber had a uniform particle size which was easily filtered, washed and processed.

The above experiments demonstrate that the proper use of an alkali metal or ammonium hydroxide with the metal salt coagulant will enable the production of emulsion polymers of uniform size free of large particles which occlude impurities and free of small particles which are difficult to filter and process. Through the use of this invention polymers of improved physical and chemical properties may be obtained by means of emulsion polymerization techniques.

Although the invention has been described with respect to specific emulsion copolymers and specific coagulants it is not intended that the details thereof shall be construed as limitations upon the scope of the invention except to the extent incorporated in the following claims.

I claim:
1. A method of coagulating a synthetic latex of a rubbery, conjugated diolefine emulsion polymerizate which comprises adding to the latex a water soluble salt of a metal of the group consisting of lead, iron, calcium, magnesium, strontium, barium, aluminum and zinc in the presence of between 20 and 50 percent of a molecular equivalent, based on the metal salt, of a compound of the group consisting of ammonium hydroxide and the alkali metal hydroxides.

2. A method of coagulating a synthetic latex of a rubbery copolymer of butadiene and a monoolefinic monomer which comprises adding to the latex a water soluble salt of a metal of the group consisting of lead, iron, calcium, magnesium, strontium, barium, aluminum and zinc in the presence of between 20 and 50 percent of a molecular equivalent, based on the metal salt, of a compound of the group consisting of ammonium hydroxide and the alkali metal hydroxides.

3. A method of coagulating a synthetic latex of a rubbery copolymer of butadiene and a monoolefinic monomer containing an oil-water emulsifying agent which comprises adding to the latex a water soluble salt of a metal of the group consisting of lead, iron, calcium, magnesium, strontium, barium, aluminum and zinc in the presence of between 20 and 50 percent of a molecular equivalent, based on the metal salt, of a compound of the group consisting of ammonium hydroxide and the alkali metal hydroxides.

4. A method of coagulating a synthetic latex of a rubbery copolymer of butadiene and acrylonitrile which comprises adding to the latex a water soluble aluminum salt and from 20 to 50 percent of the molecular equivalent, based on the aluminum salt, of sodium hydroxide.

5. A method of coagulating a synthetic latex of a rubbery copolymer of butadiene and acrylonitrile which comprises adding to the latex a water soluble zinc salt and from 20 to 50 percent of the molecular equivalent, based on the zinc salt, of sodium hydroxide.

6. In a method of preparing a solid synthetic rubbery conjugated diolefine polymerizate by the precipitation with water soluble zinc salts of aqueous emulsions of said polymerizate stabilized by means of wetting agents, the step of adding to the emulsion a compound of the group consisting of ammonium and alkali metal hydroxides in an amount equal to from 20 to 50 percent of the molecular equivalent of said hydroxides based on the zinc salt.

7. In a method of preparing a solid synthetic rubbery conjugated diolefine polymerizate by the precipitation with water soluble aluminum salts of aqueous emulsions of said polymerizate stabilized by means of wetting agents, the step of adding to the emulsion a compound of the group consisting of ammonium and alkali metal hydroxides in an amount equal to from 20 to 50 percent of the molecular equivalent of said hydroxides based on the aluminum salt.

8. A method of coagulating a synthetic latex of a rubbery copolymer of butadiene and acrylonitrile which comprises adding to the latex a water soluble salt of a metal of the group consisting of lead, iron, calcium, magnesium, strontium, barium, aluminum and zinc in the presence of between 20 and 50 percent of a molecular equivalent, based on the metal salt, of a compound of the group consisting of ammonium hydroxide and the alkali metal hydroxides.

9. A method of coagulating a synthetic latex of a rubbery copolymer of butadiene and styrene which comprises adding to the latex a water soluble salt of a metal of the group consisting of lead, iron, calcium, magnesium, strontium, barium, aluminum and zinc in the presence of between 20 and 50 percent of a molecular equivalent, based on the metal salt, of a compound of the group consisting of ammonium hydroxide and the alkali metal hydroxides.

JOSEPH P. JOHNSON.

REFERENCES CITED

The following references are of record in the file of this patent:

UNITED STATES PATENTS

| Number | Name | Date |
|---|---|---|
| 2,298,713 | Merrill | Oct. 13, 1942 |